United States Patent [19]

Chevet

[11] 4,211,830
[45] Jul. 8, 1980

[54] AIR-DEPOLARIZED PRIMARY CELL

[75] Inventor: Robert Chevet, Poitiers, France

[73] Assignees: Saft Leclanche, Poitiers; Campagnie Industrielle des Piles Electriques "Cipel", Levallois-Perret, both of France

[21] Appl. No.: 58,349

[22] Filed: Jul. 17, 1979

[30] Foreign Application Priority Data

Jul. 31, 1978 [FR] France ............................... 78 22615

[51] Int. Cl.² .............................................. H01M 4/00
[52] U.S. Cl. ......................................... 429/27; 429/66
[58] Field of Search .............................. 429/66, 27–29

[56] References Cited

U.S. PATENT DOCUMENTS

| | | | |
|---|---|---|---|
| 3,840,406 | 10/1974 | Depoix | 429/66 X |
| 3,855,000 | 12/1974 | Jammet | 429/66 X |
| 3,871,920 | 3/1975 | Grebier et al. | 429/27 |

Primary Examiner—Charles F. LeFevour
Attorney, Agent, or Firm—Kenyon & Kenyon

[57] ABSTRACT

The invention relates to an air-depolarized primary cell which includes a container (1), a negative electrode (4) disposed against the walls of the container, a positive electrode (3) disposed in the central portion of the container and a ventilation circuit (6, 8, 9, 28) for the positive electrode; a gas-filled space (15) is provided above the negative electrode and the electrolyte for accommodating the negative electrode as it expands during use; the space is delimited by the ventilation circuit, the walls of the container and a wall (26) which is impermeable to oxygen. In accordance with the invention, the periphery of the impermeable wall has a step configuration rim (27, 30) welded to the walls of the container, this avoids cracks damaging the seal (17) between the impermeable wall (26) and the ventilation circuit when the walls of the container (1) are deformed by the expanding negative electrode.

2 Claims, 1 Drawing Figure

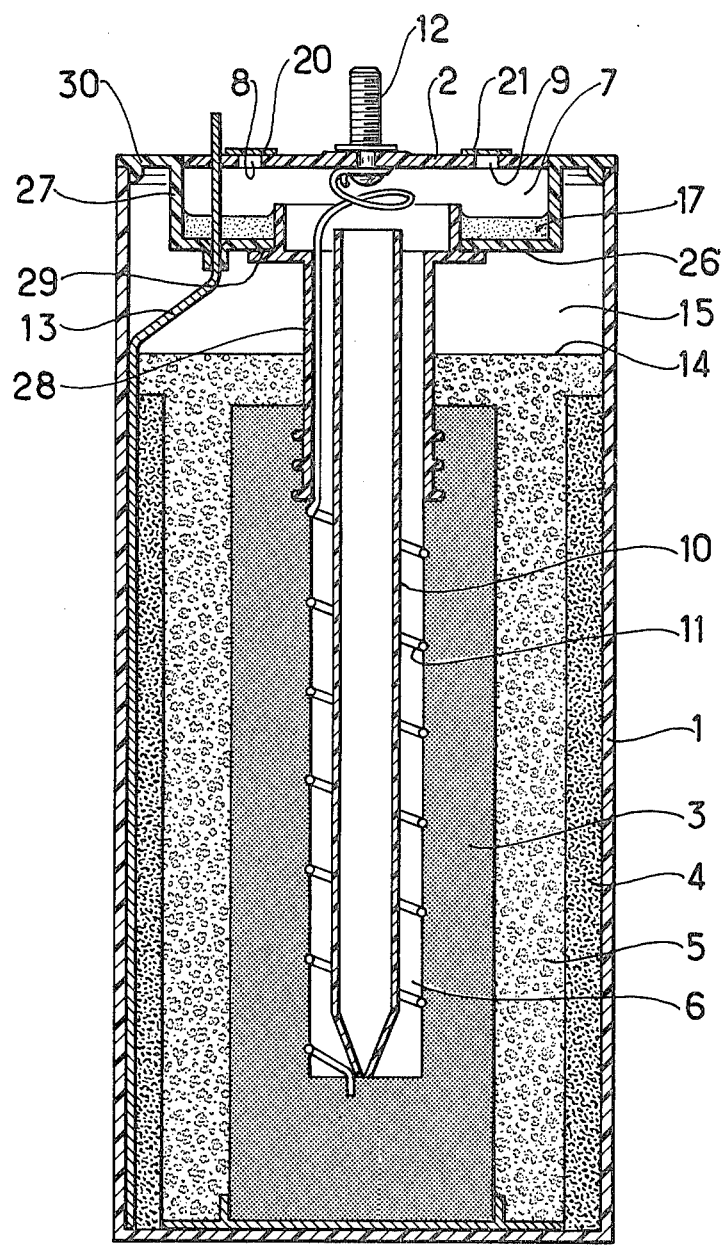

AIR-DEPOLARIZED PRIMARY CELL

The present invention relates to an air-depolarized primary cell which includes: a container; a negative electrode disposed against the walls of the container, said electrode being generally constituted by a suspension of zinc powder in an electrolyte gel; a positive electrode disposed in the central portion of the container; and a gelled electrolyte between the electrodes.

In such cells, a gas-filled space is provided above the electrolyte and the negative electrode to accommodate the increased volume of the negative electrode when the cell discharges. The gas-filled space must not communicate with the atmosphere, since spurious oxidation which is detrimental to the negative electrode would result therefrom at rest and during discharge, and especially during slow discharge. The space is separated from the outside by an oxygen-tight wall which is connected on one side to the walls of the container and on the other side to a ventilation circuit which, in some cases, can be constituted by the positive electrode itself. To make the space oxygen-tight, a layer of pitch is coated thereon above the wall. An example of such a disposition is described in our British Pat. No. 1 364 379.

More recently, an attempt has been made to prevent the inflow of air into the gas-filled space of the negative electrode by providing a tube which is impermeable to oxygen to delimit said gas-filled space on the ventilation circuit side. Whatever dispositions are taken near the cell centre to prevent the gas-filled space from communicating with the outside, it is observed that the oxygen-tight wall proves effective as long as the cell remains at rest, but that this is not true when the cell discharges. Indeed, in that case, despite the existence of the gas-filled space, the swelling of the negative electrode exerts a thrust on the walls of the container which, when deformed, cause cracking in the layer of pitch. Inflow of air results therefrom and causes untimely oxidation of the anode which is particularly appreciable during slow or discontinuous discharge.

Preferred embodiments of the present invention remedy this drawback.

The present invention provides an air-depolarized primary cell which includes: a container; a negative electrode disposed against the walls of the container; a positive electrode disposed in the central portion of the container together with a ventilation circuit for the positive electrode; a gelled electrolyte between the electrode; and a gas-filled space above the electrolyte and the negative electrode; said space being delimited by the walls of the container, the ventilation circuit and a wall which is impermeable to oxygen, said wall being situated between the walls of the container and the ventilation circuit; the periphery of said impermeable wall including a rim having a step configuration and welded at its periphery to the walls of the container.

In this way when the walls of the container tend to move apart due to the negative electrode swelling, the periphery of the impermeable wall which is welded to the walls of the container tracks moves with the walls, thereby merely opening out the angles of the step configuration. Proper oxygen-tight sealing therefore remains between the edge of the impermeable wall and the walls of the container.

When the impermeable wall and the walls of the container are made of a plastics material, welding is preferably effected ultrasonically.

The invention will be better understood from the following description with reference to the accompanying drawing in which the single FIGURE is a cross-section of an embodiment of a primary cell in accordance with the invention.

The primary cell illustrated in the FIGURE has a casing made of a plastics material, formed by a container 1 and a cover 2. Inside the casing, there is a positive central air-depolarized electrode which is mainly constituted by a catalytic mass 3 of divided carbon and a negative electrode of zinc powder disposed against the side walls of the container 1. The annular space between the electrodes is occupied by a gelled alkaline electrolyte 5 which also covers the upper portion of the negative electrode. A ventilation circuit for the positive electrode includes a vertical flue formed in the mass 3 and leading into a ventilation chamber 7 situated immediately below the cover 2, which has two openings 8 and 9 which, in the FIGURE, are stopped by plastics stoppers 20 and 21. The stoppers must be removed for the cell to operate. The openings 8 and 9 then make the chamber 7 communicate with the outside atmosphere and thus constitute a source of oxygen for the positive electrode. A H-section component 10 is disposed in the flue 6 to promote the circulation of air as described in our British Pat. No. 1 392 390. A metal wire 11 wound in a spiral along the flue 6 and embedded in the mass 3 constitutes a current output for the positive electrode and is connected to the positive terminal 12. The output of negative current passes along a metal wire 13 sunk in the electrode 4 and passing through the cover 2. A free surface 14 of the electrolyte 5 is surmounted by a gas-filled space 15 which compensates the changes in volume due to variations in temperature and to the cell discharge process.

To prevent the oxygen of the air from entering the space 15, from which it could chemically oxidize the zinc powder of the negative electrode, the space 15 is separated from the ventilation chamber 7 in an oxygen-tight manner by a wall which is impermeable to oxygen, said wall being constituted by a plastics part 26 covered with a layer of pitch 17 and whose centre is connected to a plastics tube 28 which emerges from the electrolyte. The plastics part 26 has a peripheral rim 27 in a step configuration, said rim being welded at 30 to the walls of the container 1. The cover 2 is fitted inside the rim 27 where it can either be a force fit or be cemented. The plastics part 26 can be connected at 29 to the upper portion of the tube 28 by cementing, the layer of pitch 17 improving the seal, as shown in the FIGURE. But it can also be ultrasonically welded to the tube 28. The lower portion of the tube 28 is surrounded in a sealed manner by the mass 3, in particular by moulding the mass round the tube. If, for example, the tube 28 is made of polystyrene or a copolymer of styrene such as the copolymer acrylonitrile-butadiene-styrene (ABS) and the mass 3 is made from a mixture of a catalytic material (carbon), polystyrene acting as a binding agent and a solvent of polystyrene (chlorinated hydrocarbon, aromatic hydrocarbon, ketone), the solvent superficially dissolves the material of the tube. This makes the mass adhere properly.

It can be seen that, if the walls of the container 1 tend to move apart, the portion of the step configuration rim 27 which is shown vertical in the FIGURE will assume an oblique position. If this results in cracking of the mass of pitch 17 near this portion, it does not affect the sealing of the space 15 in any way. Therefore, there is no spurious discharge of the negative electrode during discharge or while at rest.

The above description relates to an embodiment in which the inflow of air in the space 15 is prevented by a central tube 28 which is immersed in the electrolyte and is connected in a sealed manner to the catalytic mass. But the invention relates mainly to the improvement of the sealing between the impermeable wall and the walls of the container and can be applied just as well to embodiments which use other kinds of central ventilation circuit and other kinds of connection of the impermeable wall thereto.

I claim:

1. An air-depolarized primary cell which includes: a container; a negative electrode disposed against the walls of the container; a positive electrode disposed in the central portion of the container together with a ventilation circuit in the positive electrode; a gelled electrolyte between the electrodes; and a gas-filled space above the electrolyte and the negative electrode; said space being delimited by the walls of the container, the ventilation circuit and a wall which is impermeable to oxygen, said wall being situated between the walls of the container and the ventilation circuit and partially covered with a layer of sealing material; the periphery of said impermeable wall including a rim having a step configuration and welded to the periphery of the walls of the container.

2. A primary cell according to claim 1, wherein said impermeable wall and the walls of the container are made of a plastics material and that the welds are effected ultrasonically.

* * * * *